US012631091B2

(12) United States Patent
McChesney et al.

(10) Patent No.: US 12,631,091 B2
(45) Date of Patent: May 19, 2026

(54) METHOD OF GENERATING ENERGY FROM SEQUESTERED SUPERCRITICAL CARBON DIOXIDE

(71) Applicant: Halliburton Energy Services, Inc., Houston, TX (US)

(72) Inventors: Ryan W. McChesney, Carrollton, TX (US); Stephen Michael Greci, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 167 days.

(21) Appl. No.: 18/523,462

(22) Filed: Nov. 29, 2023

(65) Prior Publication Data

US 2025/0172056 A1 May 29, 2025

(51) Int. Cl.
| | |
|---|---|
| *E21B 43/16* | (2006.01) |
| *E21B 41/00* | (2006.01) |
| *F01D 15/10* | (2006.01) |
| *F01K 25/10* | (2006.01) |

(52) U.S. Cl.
CPC .......... *E21B 41/0064* (2013.01); *F01D 15/10* (2013.01); *F01K 25/103* (2013.01); *Y02C 20/40* (2020.08); *Y02E 70/30* (2013.01); *Y02P 90/50* (2015.11)

(58) Field of Classification Search
CPC ... E21B 41/0064; F01K 25/103; Y02C 20/40; Y02E 70/30; F01D 15/10; Y02P 90/50
See application file for complete search history.

(56) References Cited

U.S. PATENT DOCUMENTS

| | | | |
|---|---|---|---|
| 6,668,554 B1 | 12/2003 | Brown | |
| 7,254,944 B1 | 8/2007 | Goetzinger et al. | |
| 11,162,342 B2 | 11/2021 | Drescher et al. | |
| 11,499,477 B2 | 11/2022 | Lemieux | |
| 2010/0241363 A1* | 9/2010 | Keeling | G01N 33/004 |
| | | | 702/51 |
| 2011/0066380 A1 | 3/2011 | Hager et al. | |
| 2011/0146978 A1* | 6/2011 | Perlman | C10J 3/00 |
| | | | 166/266 |
| 2013/0341246 A1 | 12/2013 | Keith et al. | |
| 2015/0027952 A1 | 1/2015 | Schmidt et al. | |
| 2019/0390578 A1* | 12/2019 | Younes | F23C 10/18 |
| 2022/0056893 A1* | 2/2022 | Pogge | F02C 1/05 |
| 2022/0178336 A1 | 6/2022 | Ramamurthy et al. | |
| 2022/0316451 A1 | 10/2022 | Bodishbaugh et al. | |
| 2023/0092034 A1 | 3/2023 | Taggart, IV | |
| 2023/0243330 A1 | 8/2023 | Rasmussen | |

OTHER PUBLICATIONS

"PCT Application No. PCT/US2023/081705 International Search Report and Written Opinion", Aug. 23, 2024, 12 pages.

* cited by examiner

*Primary Examiner* — Carib A Oquendo
(74) *Attorney, Agent, or Firm* — DeLizio, Peacock, Lewin & Guerra LLP

(57) ABSTRACT

A Carbon Capture and Storage (CCS) system and method generates electricity by applying a supercritical fluid to an expansion turbine connected to a generator. The expansion turbine sends the fluid from the expansion turbine to a compressor after expansion. The compressor compresses the fluid output by the expansion turbine into a desired supercritical state and the compressed fluid is injected into one or more first sequestration reservoirs in a reservoir formation.

20 Claims, 11 Drawing Sheets

700

GENERATING ELECTRICITY BY APPLYING SUPERCRITICAL CARBON DIOXIDE TO AN EXPANSION TURBINE CONNECTED TO A GENERATOR

702

COMPRESSING THE CARBON DIOXIDE OUTPUT BY THE EXPANSION TURBINE

704

ACTIVATING RESERVOIR INJECTION EQUIPMENT TO STORE THE RECOMPRESSED SUPERCRITICAL CARBON DIOXIDE TO A SEQUESTRATION RESERVOIR

METHOD OF GENERATING ENERGY FROM SEQUESTERED SUPERCRITICAL CARBON DIOXIDE

BACKGROUND

Carbon Capture and Storage (CCS) involves the capture, compression to a supercritical pressure and injection of carbon dioxide for permanent storage in a suitable formation containing, for example, a cap rock formation. Carbon dioxide is usually captured from one or more large point sources, such as a chemical plant, and stored in an underground formation. In some example approaches, a relatively pure stream of carbon dioxide from industrial sources is separated, treated and transported to a long-term storage location, such as a deep geological formation. CCS is a readily available technology that can significantly reduce emissions from sectors such as refining, chemical, cement, steel and power generation.

BRIEF DESCRIPTION OF THE DRAWINGS

The disclosure may be better understood by referencing the accompanying drawings.

Like reference numbers and designations in the various drawings indicate like elements.

DETAILED DESCRIPTION

Figure 1:
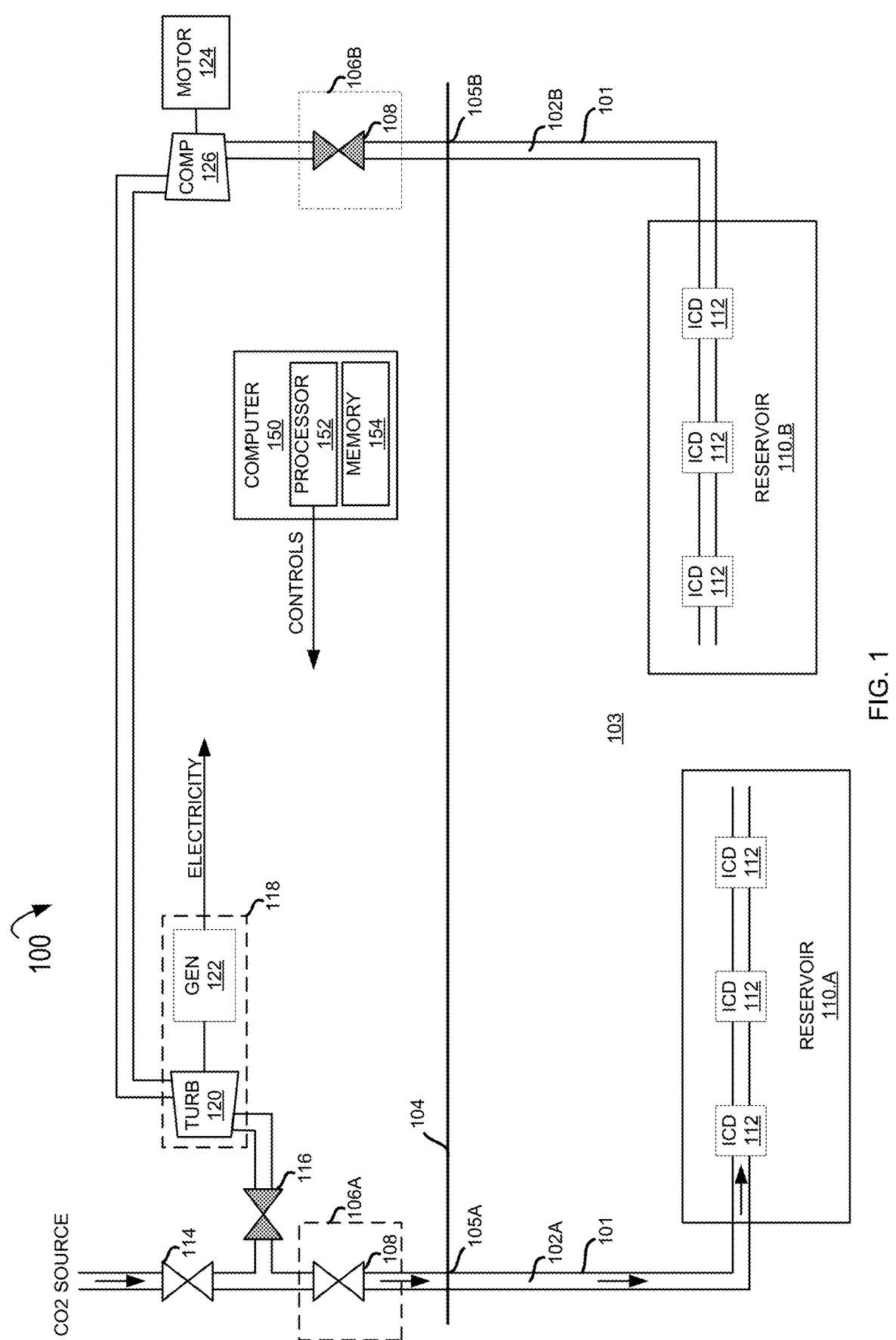
FIG. 1 illustrates an example carbon capture and storage (CCS) system, according to aspects of the present disclosure.

The description that follows includes example systems, methods, techniques, and program flows that embody embodiments of the disclosure. Unless otherwise specified, use of the terms "connect," "engage," "couple," "attach," or any other like term describing an interaction between elements is not meant to limit the interaction to a direct interaction between the elements and may also include an indirect interaction between the elements described. Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

CCS technologies are well documented. To date, however, CCS based on deep geological formations has had limited acceptance due to the cost of transporting and storing the carbon dioxide in underground locations. Typically, CCS is considered an expense that needs to be incentivized or subsidized via taxes or other means. It is, however, possible to not only sequester carbon dioxide permanently but to also use the stored carbon dioxide to generate revenue through power generation. In one example approach, the injection equipment includes power generation equipment. In one such example approach, a CCS system pressurizes carbon dioxide before injecting the carbon dioxide at supercritical pressure into a high-pressure formation. The CCS system continues to inject the supercritical carbon dioxide until power generation based on the stored carbon dioxide is more economically beneficial than injection. The CCS system then isolates the carbon dioxide source and uses the pressurized supercritical CO2 to produce electricity.

In one example approach, the CCS system produces electricity by expanding supercritical carbon dioxide across an expansion turbine using a modified Brayton cycle. The turbine discharge may then be repressurized and injected into a separate lower pressure formation, with the net energy produced related to the temperature and pressure variance between the two independent formations. In one such example approach, the CCS system moves the supercritical carbon dioxide between two different isolated regions of a single formation. In another such example approach, the CCS system moves the supercritical carbon dioxide between two or more separate formations, with one formation at a lower pressure than the formation that sources the supercritical carbon dioxide.

In the discussion below, the modified Brayton cycle may be performed on any supercritical fluid, including, for example, supercritical carbon dioxide, supercritical nitrogen, supercritical helium, and supercritical air. Any of the supercritical fluid may be used as part of a power generation system based on the use of supercritical fluid stored in a sequestration reservoir in a reservoir formation to generate electricity. The use of supercritical carbon dioxide has, however, the additional benefit of capturing and sequestering a pollutant. The following discussion will be based on the use of supercritical carbon dioxide as the supercritical fluid.

Example Supercritical Carbon Dioxide Power Generation System

In one example approach, a power generation system may use two sequestration formations that are isolated from each other to store power in the form of supercritical carbon dioxide. Electricity may be generated by transferring supercritical carbon dioxide from the first sequestration formation to the second, lower pressure, formation. Eventually the final target pressure is achieved in each formation. Since, at that point, there would be little difference in pressure between the two or more formations, carbon dioxide transfer between formations no longer generates meaningful amounts of electricity. The captured carbon dioxide in both sequestration formations is then capped so the carbon dioxide may be stored permanently.

In some example approaches, density autonomous inflow control device (DAICD) systems and electronic inflow control devices (EICD) systems are used to allow the most energetic carbon dioxide formations to be used to produce energy. The inflow control device may also be used to restrict brine in the formations since the combination of carbon dioxide and brine will not expand across the turbine as well, reducing the Brayton cycle efficiency. Combining the above energy recovery method with the DAICD or EICD system may substantially improve the overall energy recovery and efficiency.

What is described below, therefore, is a system and method for CCS that combines carbon dioxide storage with selective energy generation. In some examples, carbon dioxide stored as supercritical carbon dioxide in a deep geological formation is used to turn an expansion turbine, generating electrical power. In some examples, two or more reservoirs are used to store supercritical carbon dioxide at different pressures in a closed system that permanently sequesters carbon dioxide while also using this stored energy to generate electricity when desired. In some such examples, the CCS system generates electricity from sequestered supercritical carbon dioxide based on, for example, the demand for or price of the generated electricity, improving the CCS business case.

FIG. 1 illustrates an example CCS system, according to aspects of the present disclosure. In the example shown in FIG. 1, CCS system 100 includes a first borehole 102A connected to a first sequestration reservoir 110A in a reservoir formation 103 and a second borehole 102B connected to a second sequestration reservoir 110B in reservoir formation 103 (collectively, "borcholes 102" and "sequestration reservoirs 110," respectively).

In the example shown in FIG. 1, each borehole 102 includes a casing 101 and an opening 105 at surface 104. In some such example approaches, the supercritical carbon dioxide passes through first reservoir injection equipment 106A before entering borehole 102A at opening 105A and through second reservoir injection equipment 106B before entering borehole 102B at opening 105B (collectively, "reservoir injection equipment 106" and "openings 105," respectively). In some such example approaches, the injection equipment 106 includes an isolation valve 108; in such example approaches, the supercritical carbon dioxide passes through the isolation valve 108 and through each borehole 102 before entering reservoirs 110 for carbon sequestration.

In the example shown in FIG. 1, CCS system 100 further includes power generation equipment 118, a motor 124 and a compressor 126. In one such example, the power generation equipment includes an expansion turbine 120 and a generator 122. Carbon dioxide received from expansion turbine 120 at compressor 126 is compressed under power from motor 124 and injected into reservoir 110B via reservoir injection equipment 106. In one example approach, source isolation valve 114 isolates CCS system from the carbon dioxide source, while power equipment isolation valve 116 isolates the power equipment from the carbon dioxide source while carbon dioxide is being injected into reservoir 110A. In the example shown in FIG. 1, isolation valves 108, 114, and 116 are closed when filled with gray and open when not filled with gray.

Figure 2:
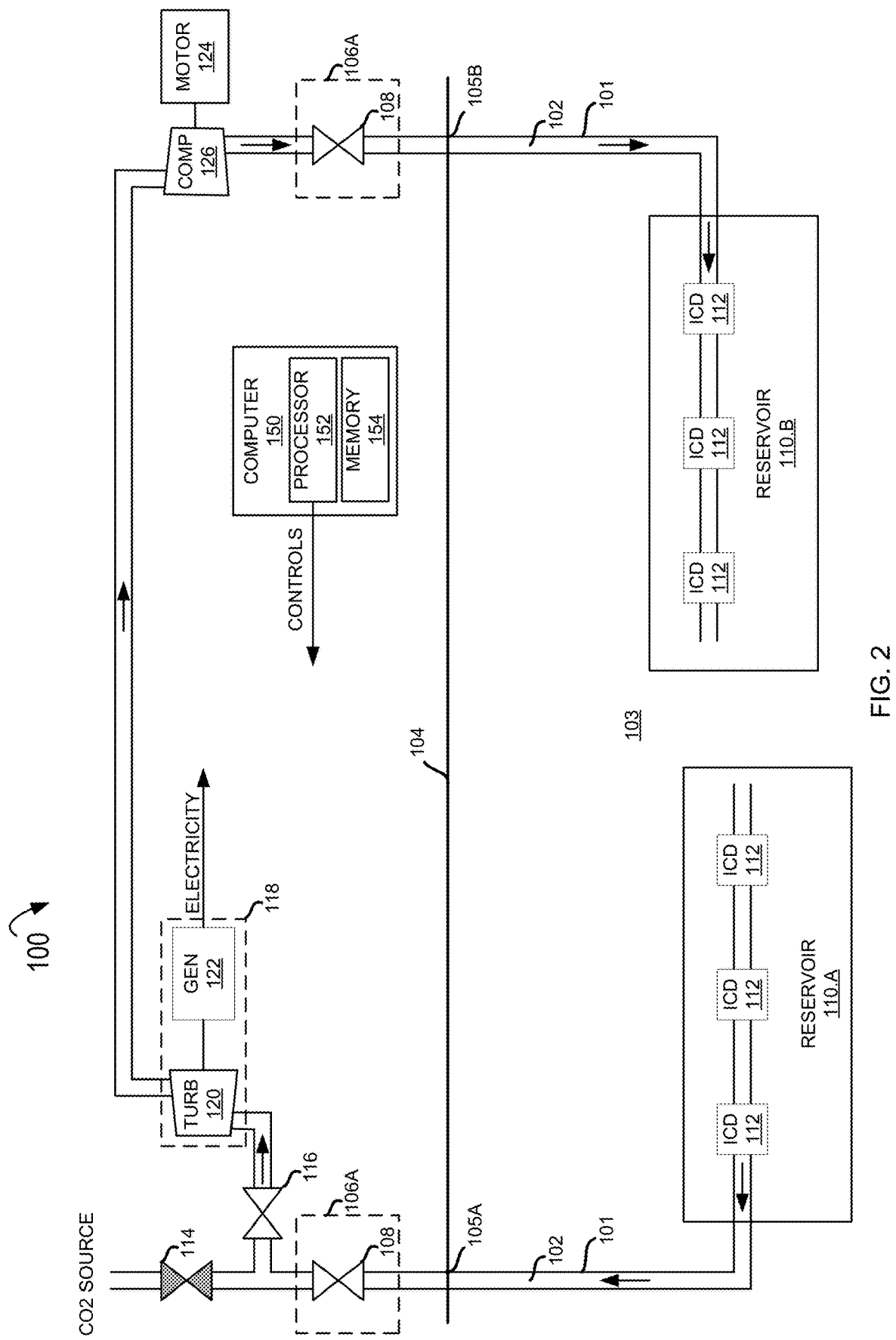
FIG. 2 illustrates the example CCS system of FIG. 1 configured to generate electricity, according to aspects of the present disclosure.

In the example shown in FIG. 1, injection equipment 106A receives carbon dioxide from a carbon dioxide source through a source isolation valve 114 (shown as open). Power generation isolation valve 116 is closed to isolate the power generation equipment 118 while isolation valve 108 of reservoir injection equipment 106A is open to allow the reservoir injection equipment 106A to inject carbon dioxide received from the carbon dioxide source into sequestration reservoir 110A. In one example approach, the carbon dioxide is pressurized and heated to supercritical pressure and injected into reservoir 110A under high-pressure. Injection continues until the reservoir is full or until an operator decides to generate electricity from the sequestered carbon dioxide. This may, in some example approaches, occur when the operator determines that power generation based on the stored carbon dioxide is more economically beneficial than further injection. When power generation based on the stored carbon dioxide is more economically beneficial than injection, injection pauses (i.e., isolation valve 114 is closed as shown in FIG. 2) and power generation begins. When the reservoir is full, steps may be taken to preserve the storage of the supercritical carbon dioxide for the desired number of years, or until power generation is once again feasible.

In one example approach, CCS system 100 includes a computer system 150. In one such example approach, computer system 150 includes a processor 152 and a memory 154. In one example approach, instructions are stored in memory 154 that, when executed by processor 152, allow the processor 152 to control the injection and power generation processes. In one example approach the computer system 150 receives a signal from a carbon dioxide source indicating that carbon dioxide is available for injection in a sequestration reservoir 110. Processor 152 access instructions stored in memory 154 to determine the reservoirs 110A and 110B to be used to receive the carbon dioxide. In the example shown in FIG. 1, the carbon dioxide is stored in reservoir 110A, so processor 152 accesses instructions stored in memory 154 to send out signals opening isolation valves 108 and 114 and closing isolation valve 116 and to activate reservoir injection equipment 106A to inject the received carbon dioxide in reservoir 110A. When an operator determines to generate electricity based on the carbon dioxide stored in reservoir 110A, processor 152 accesses instructions stored in memory 154 to pause injection (i.e., close source isolation valve 114 and open power equipment isolation valve 116 and isolation valve 108 of reservoir injection equipment 106B, as shown in FIG. 2). Power generation then begins.

FIG. 2 illustrates the CCS system of FIG. 1 configured to generate electricity, according to aspects of the present disclosure. In the example shown in FIG. 2, source isolation valve 114 is closed, while power equipment isolation valve 116 is open, allowing sequestered carbon dioxide from reservoir 110A to flow through isolation valve 108 of injection equipment 106A and power equipment isolation valve 116 to power generation equipment 118. In the example approach shown in FIG. 2, the power generation equipment 118 includes an expansion turbine 120 and a generator 122. Supercritical carbon dioxide stored in reservoir 110A flows through expansion turbine 120, turning generator 122 to generate electricity. In some example approaches, the carbon dioxide flowing from expansion turbine 120 is compressed by compressor 126 when powered by motor 124 and injected into reservoir 110B via reservoir injection equipment 106B.

In one example approach, CCS system 100 includes a computer system 150 having a processor 152 and a memory 154. In one example approach, instructions are stored in memory 154 that, when executed by processor 152, allow the processor 152 to control the injection and power generation processes. In one example approach, the computer system 150 receives a signal from an operator indicating that the operator wants to generate electricity. Processor 152 accesses instructions stored in memory 154 to determine the reservoirs 110A and 110B to be used to retrieve the carbon dioxide. In the example shown in FIG. 2, the carbon dioxide to be used for power generation is stored in reservoir 110A, so processor 152 accesses instructions stored in memory 154 to send out signals closing source isolation valve 114 and opening power equipment isolation valve 116 and isolation valves 108 of reservoir injection equipment 106A and 106B. If pressure in reservoir 110B is sufficiently lower than pressure in reservoir 110A, supercritical carbon dioxide flows between reservoir 110A and 110B, passing through expansion turbine 120 and generating electricity via generator 122. The operator may cut off the electricity generation process at any time and resume injecting supercritical carbon dioxide into reservoir 110A.

In some example approaches, as shown in FIGS. 1 and 2, borcholes 102 further include inflow control devices (ICDs) 112 placed at certain locations in each reservoir 110. The supercritical carbon dioxide stored in reservoir 110A passes through the ICDs 112 when extracted for power generation. In some example approaches, the ICDs limit the amount of brine and other contaminants in the supercritical carbon dioxide extracted from the reservoirs 110 since the combination of carbon dioxide and brine will not expand across the turbine as well, reducing the Brayton cycle efficiency. Combining the above electricity generation method with an appropriate DAICD or EICD system may substantially improve the overall energy recovery and efficiency.

Figures 3A, 3B:
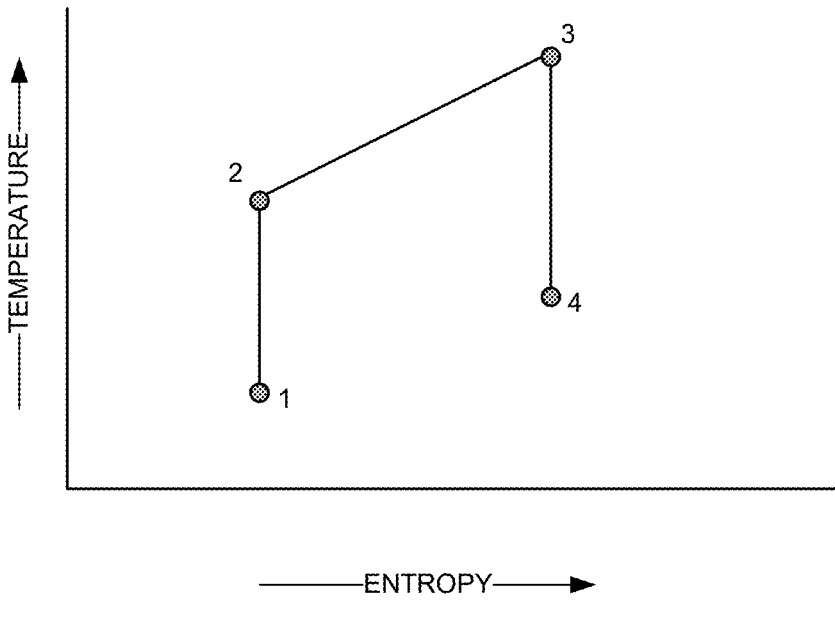
FIGS. 3A and 3B illustrate a Brayton cycle for the CCS systems of FIGS. 1, 2 and 4-7, according to aspects of the present disclosure.

FIGS. 3A and 3B show temperature-entropy diagrams (Ts diagrams) illustrating a Brayton cycle for the CCS systems of FIGS. 1, 2 and 4-7, according to aspects of the present disclosure. In a typical Brayton cycle, a working fluid circulates between a compressor and an expansion turbine. The cycle efficiency varies as a function of pressure ratio.

In a typical approach, thermal energy is added to the working fluid just prior to the expansion turbine and a cooler is used to lower the temperature of the working fluid after expansion to the desired inlet temperature of the compressor. Ts diagrams are a useful and common tool, particularly because they help to visualize the heat transfer during a process. For reversible (ideal) processes, the area under the T-s curve of a process is the heat transferred to the system during that process.

In an example approach used in the CCS systems of FIGS. 1 and 2, the working fluid is supercritical carbon dioxide. The carbon dioxide is received at reservoir injection equipment 106A (point 1 of FIG. 3A) and stored as supercritical carbon dioxide to reservoir 110A (point 2 of FIG. 3A). In some example approaches, the carbon dioxide is received as supercritical carbon dioxide and stored directly into reservoir 110A. In other example approaches, the carbon dioxide is not supercritical; in such example approaches, the carbon dioxide is compressed and heated to supercritical by the reservoir injection equipment 106A before being stored into reservoir 110A.

An advantage of sequestering supercritical carbon dioxide in a deep sequestration reservoir such as reservoir is that the supercritical carbon dioxide is heated by the reservoir formation 103, eliminating or reducing the need for a separate heater for heating the supercritical carbon dioxide just prior to the expansion turbine 120. In the example shown in FIG. 3A, this is illustrated in the increase in temperature and entropy (point 3 of FIG. 3A) as the supercritical carbon dioxide resides in reservoir 110A. The supercritical carbon dioxide is retrieved from reservoir 110A and passed through expansion turbine 120, where the heated, pressurized carbon dioxide expands on turbine 120, giving up its energy. The work done by expansion turbine 120 is illustrated in the movement from point 3 to point 4 in FIG. 3A.

The examples shown in FIGS. 1 and 2 are open Brayton cycle systems where supercritical carbon dioxide retrieved from one reservoir is stored in a second reservoir. In the example shown in FIG. 2, the carbon dioxide flowing through expansion turbine 120 is received by compressor 126 and recompressed prior to being injected in reservoir 110B. In the example shown in FIG. 3B, this compression cycle is shown in the movement from point 5 to point 6. In some examples, the Brayton cycle is designed to ensure that the carbon dioxide received at the inlet of the compressor is still in a supercritical state, where the density is still relatively high and the power requirement for compression is lower.

Figure 4:
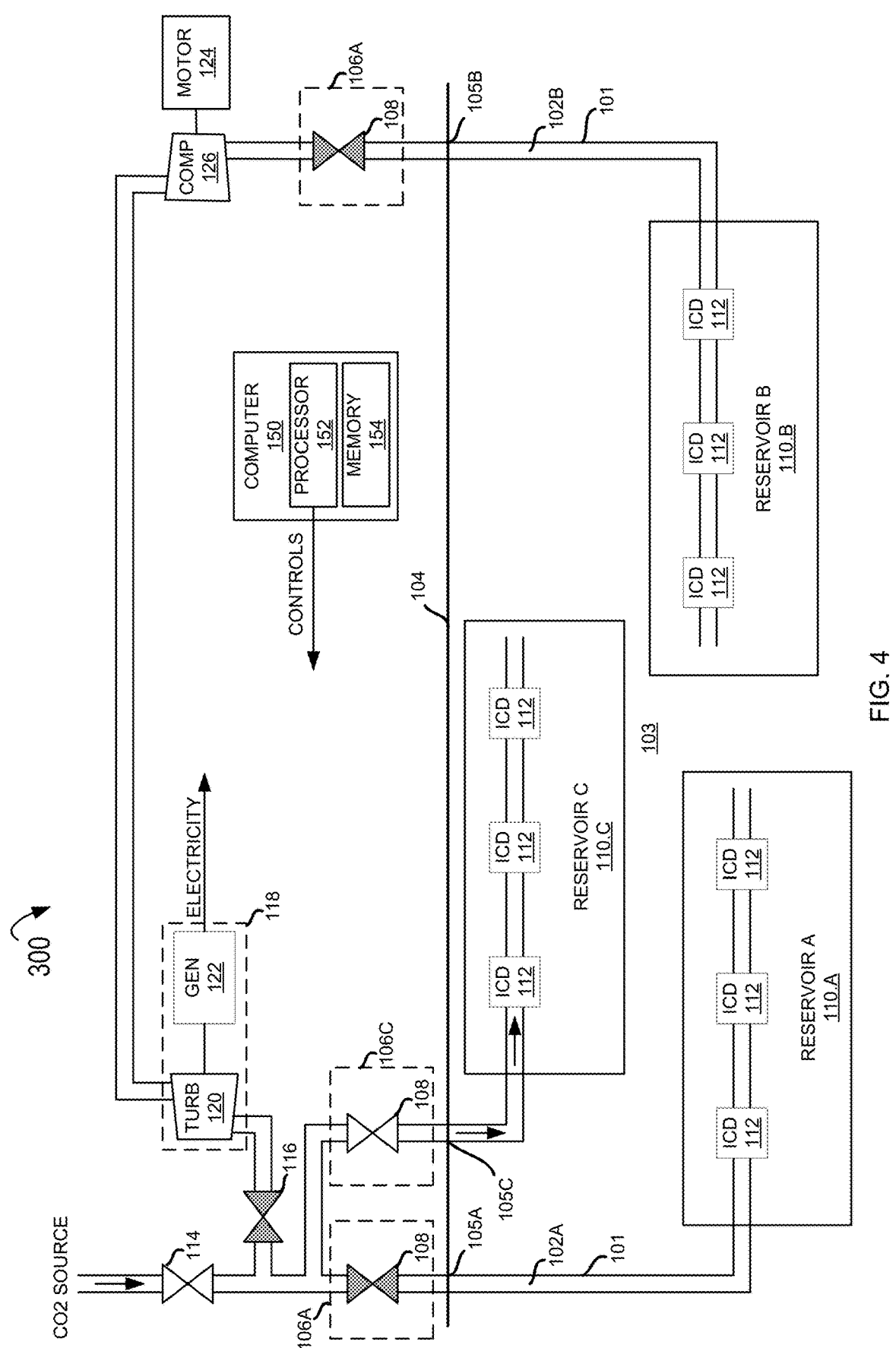
FIG. 4 illustrates another example CCS system, according to aspects of the present disclosure.

FIG. 4 illustrates another example CCS system, according to aspects of the present disclosure. In the example shown in FIG. 4, CCS system 100 includes a first borehole 102A connected to a first sequestration reservoir 110A in a reservoir formation 103, a second borehole 102B connected to a second sequestration reservoir 110B in reservoir formation 103, and a third borehole 102C connected to a third sequestration reservoir 110C in reservoir formation 103 (collectively, "boreholes 102" and "sequestration reservoirs 110," respectively).

In the example shown in FIG. 4, each borehole 102 includes a casing 101 and an opening 105 at surface 104. Borehole 102A is connected to reservoir injection equipment 106A, borehole 102B is connected to reservoir injection equipment 106B, and borehole 102C is connected to reservoir injection equipment 106C. In the example shown in FIG. 4, the supercritical carbon dioxide passes through reservoir injection equipment 106A before entering borehole 102A at opening 105A, through second reservoir injection equipment 106B before entering borehole 102B at opening 105B, and through reservoir injection equipment 106C before entering borehole 102C at opening 105C. In some such example approaches, the reservoir injection equipment 106 includes an isolation valve 108; in such example approaches, the supercritical carbon dioxide passes through the isolation valve 108 and through each borehole 102 before entering reservoirs 110 for carbon sequestration.

In the example shown in FIG. 4, CCS system 100 further includes power generation equipment 118, a motor 124 and a compressor 126. In one such example, the power generation equipment includes an expansion turbine 120 and a generator 122. Carbon dioxide received from expansion turbine 120 at compressor 126 is compressed under power from motor 124 and injected into reservoir 110B via reservoir injection equipment 106. In one example approach, source isolation valve 114 isolates CCS system from the carbon dioxide source, while power equipment isolation valve 116 isolates the power equipment from the carbon dioxide source while carbon dioxide is being injected into reservoir 110A.

In the example shown in FIG. 4, injection equipment 106C receives carbon dioxide from a carbon dioxide source through a source isolation valve 114 (shown as open). Power generation isolation valve 116 is closed to isolate the power generation equipment 118 while isolation valve 108 of reservoir injection equipment 106C is open to allow the reservoir injection equipment 106C to inject carbon dioxide received from the carbon dioxide source into sequestration reservoir 110C. In one example approach, the carbon dioxide is pressurized and heated to supercritical pressure and injected into reservoir 110C under high-pressure. Injection continues until the reservoir is full or until an operator decides to generate electricity from the sequestered carbon dioxide. This may, in some example approaches, occur when the operator determines that power generation based on the stored carbon dioxide is more economically beneficial than further injection. When power generation based on the stored carbon dioxide is more economically beneficial than injection, injection pauses (i.e., isolation valve 114 is closed as shown in FIG. 5) and power generation begins.

In one example approach, CCS system 100 of FIG. 4 also includes a computer system 150 such as is shown in FIGS. 1 and 2. In one such example approach, computer system 150 includes a processor 152 and a memory 154. In one example approach, instructions are stored in memory 154 that, when executed by processor 152, allow the processor 152 to control the injection and power generation processes. In one example approach the computer system 150 receives a signal from a carbon dioxide source indicating that carbon dioxide is available for injection in a sequestration reservoir 110. Processor 152 access instructions stored in memory 154 to determine the reservoirs 110A, 110B and 110C to be used to receive the carbon dioxide. In the example shown in FIG. 4, the carbon dioxide is stored in reservoir 110C, so processor 152 accesses instructions stored in memory 154 to send out signals opening source isolation valve 114 and isolation valve 108 of reservoir injection equipment 106C and closing isolation valve 116. Processor 152 then activates reservoir injection equipment 106C to inject the received carbon dioxide in reservoir 110C. When an operator determines to generate electricity based on the carbon dioxide stored in reservoir 110C, processor 152 accesses instructions stored in memory 154 to pause injection (i.e., close source isolation valve 114 and open power equipment isolation valve 116 and isolation valve 108 of reservoir injection equipment 106B, as shown in FIG. 5). Power generation then begins.

Figure 5:
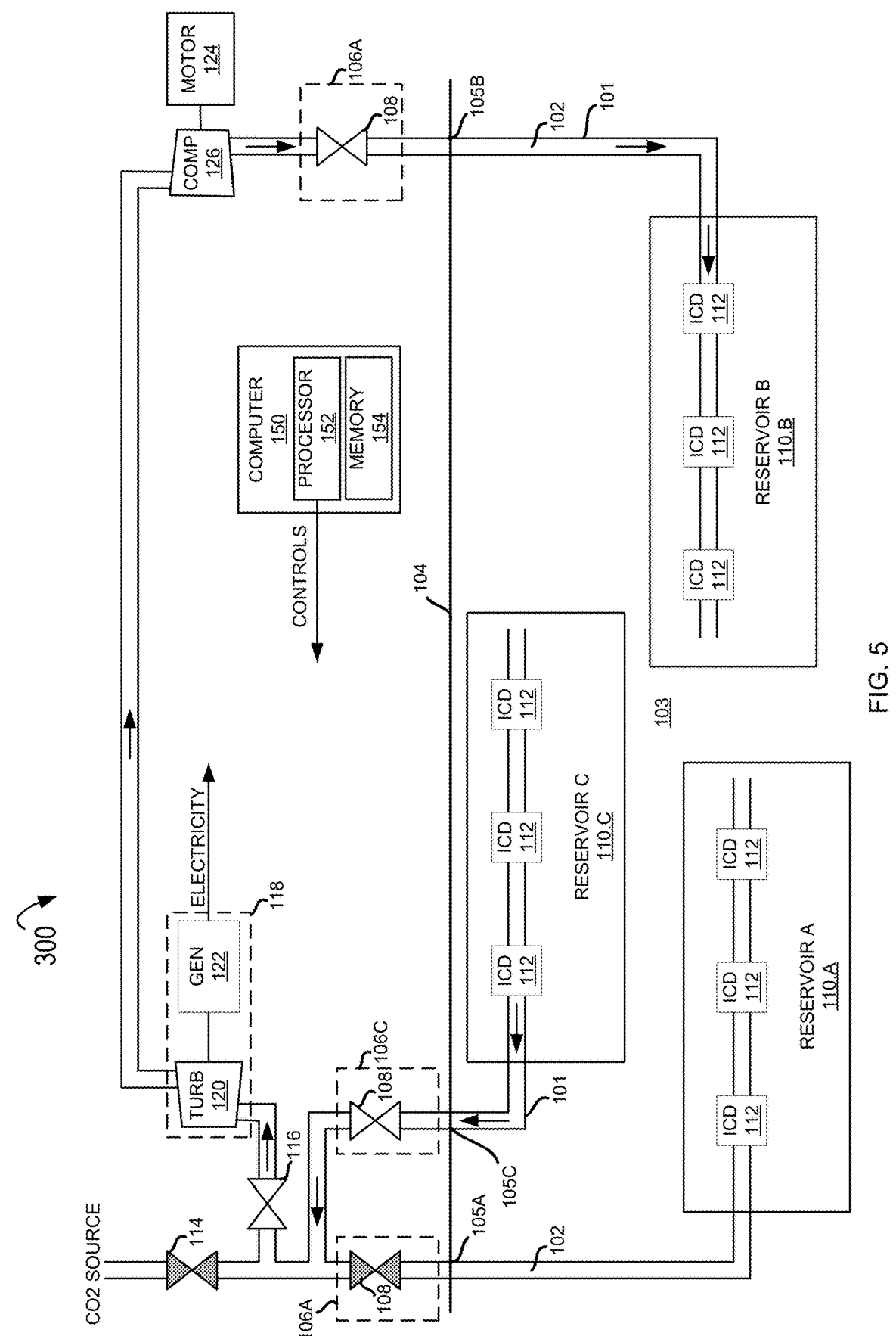
FIG. 5 illustrates the example CCS system of FIG. 4 configured to generate electricity, according to aspects of the present disclosure.

FIG. 5 illustrates the CCS system of FIG. 4 configured to generate electricity, according to aspects of the present disclosure. In the example shown in FIG. 5, source isolation valve 114 is closed, while power equipment isolation valve 116 is open, allowing sequestered carbon dioxide from reservoir 110C to flow through isolation valve 108 of injection equipment 106C and power equipment isolation valve 116 to power generation equipment 118. In the example approach shown in FIG. 5, the power generation equipment 118 includes an expansion turbine 120 and a generator 122. Supercritical carbon dioxide stored in reservoir 110C flows through expansion turbine 120, turning generator 122 to generate electricity. In some example approaches, the carbon dioxide flowing from expansion turbine 120 is compressed by compressor 126 when powered by motor 124 and injected into reservoir 110B via reservoir injection equipment 106B.

In one example approach, CCS system 100 includes a computer system 150 having a processor 152 and a memory 154. In one example approach, instructions are stored in memory 154 that, when executed by processor 152, allow the processor 152 to control the injection and power generation processes. In one example approach, the computer system 150 receives a signal from an operator indicating that the operator wants to generate electricity. Processor 152 accesses instructions stored in memory 154 to determine the reservoirs 110 to be used to retrieve the carbon dioxide and to reinject the supercritical carbon dioxide. In the example shown in FIG. 5, the carbon dioxide to be used for power generation is stored in reservoir 110C, so processor 152 accesses instructions stored in memory 154 to send out signals closing source isolation valve 114 and opening power equipment isolation valve 116 and isolation valves 108 of reservoir injection equipment 106B and 106C. If pressure in reservoir 110B is sufficiently lower than pressure in reservoir 110A, supercritical carbon dioxide flows between reservoir 110C and 110B, passing through expansion turbine 120 and generating electricity via generator 122. The operator may cut off the electricity generation process at any time and resume injecting supercritical carbon dioxide into reservoir 110C or may switch to injecting supercritical carbon dioxide into reservoir 110A.

In some such example approaches, as shown in FIGS. 4 and 5, boreholes 102 further include inflow control devices (ICDs) 112 placed at certain locations in each reservoir 110. The supercritical carbon dioxide stored in reservoir 110C passes through the ICDs 112 when extracted for power generation. In some example approaches, the ICDs limit the amount of brine and other contaminants in the supercritical carbon dioxide extracted from the reservoirs 110 since the combination of carbon dioxide and brine will not expand across the turbine as well, reducing the Brayton cycle efficiency. Combining the above electricity generation method with an appropriate DAICD or EICD system may substantially improve the overall energy recovery and efficiency.

In some example approaches, supercritical carbon dioxide in both reservoirs 110A and 110C is used to generate electricity via expansion turbine 120. In one such example approach, the ICDs 112 regulate the transfer of supercritical carbon dioxide from reservoirs 110A and 110B, ensuring that the supercritical carbon dioxide received at the inlet of the expansion turbine 120 is at a high pressure and not contaminated by brine or other contaminants.

Figure 6:
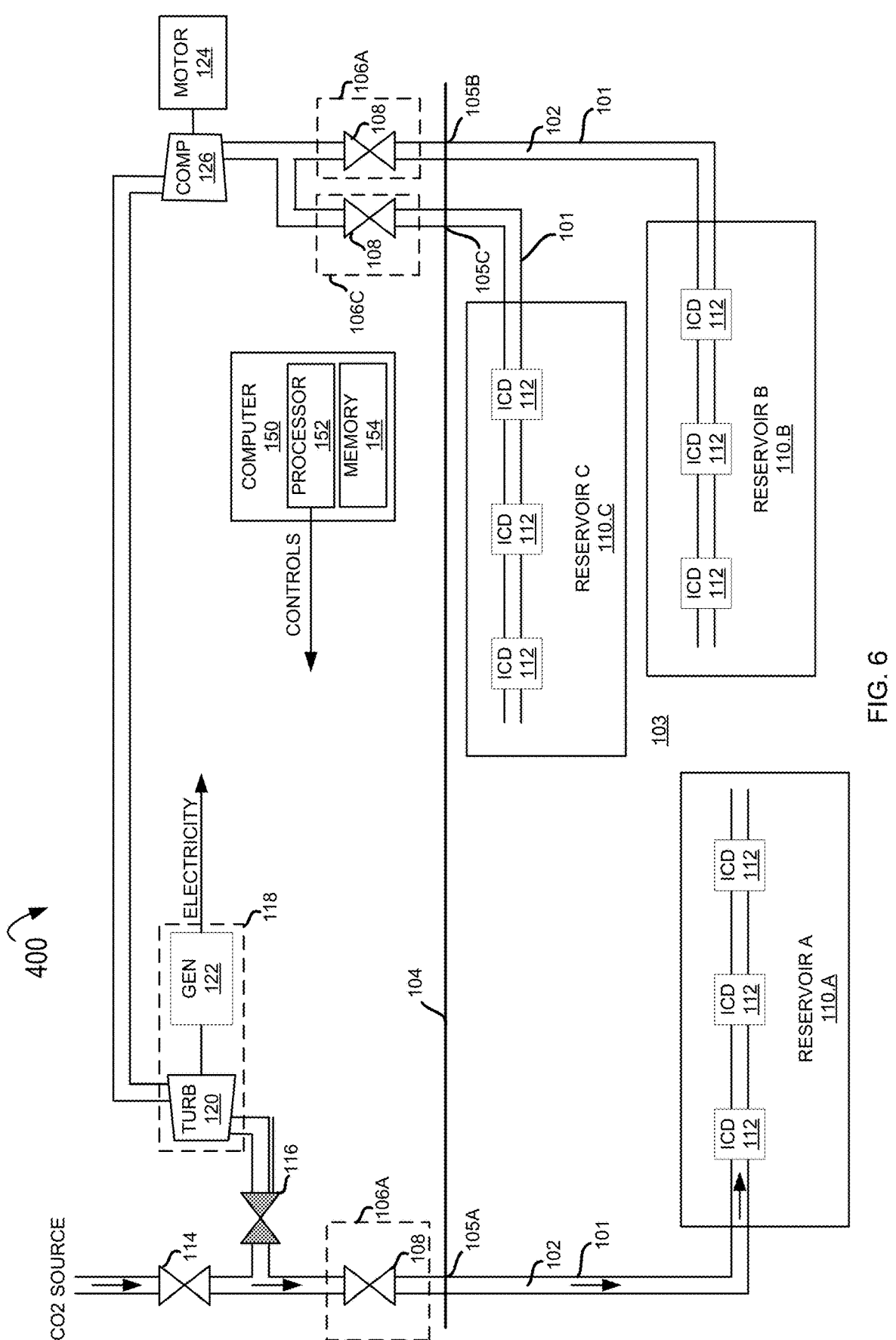
FIG. 6 illustrates another example CCS system, according to aspects of the present disclosure.

FIG. 6 illustrates another example CCS system, according to aspects of the present disclosure. In the example shown in FIG. 6, CCS system 100 includes a first borehole 102A connected to a first sequestration reservoir 110A in a reservoir formation 103, a second borehole 102B connected to a second sequestration reservoir 110B in reservoir formation 103, and a third borehole 102C connected to a third sequestration reservoir 110C in reservoir formation 103 (collectively, "boreholes 102" and "sequestration reservoirs 110," respectively).

In the example shown in FIG. 6, each borehole 102 includes a casing 101 and an opening 105 at surface 104. Borehole 102A is connected to reservoir injection equipment 106A, borehole 102B is connected to reservoir injection equipment 106B, and borehole 102C is connected to reservoir injection equipment 106C. In the example shown in FIG. 6, the supercritical carbon dioxide passes through reservoir injection equipment 106A before entering borehole 102A at opening 105A, through second reservoir injection equipment 106B before entering borehole 102B at opening 105B, and through reservoir injection equipment 106C before entering borehole 102C at opening 105C. In some such example approaches, the reservoir injection equipment 106 includes an isolation valve 108; in such example approaches, the supercritical carbon dioxide passes through the isolation valve 108 and through each borehole 102 before entering reservoirs 110 for carbon sequestration.

In the example shown in FIG. 6, CCS system 100 further includes power generation equipment 118, a motor 124 and a compressor 126. In one such example, the power generation equipment includes an expansion turbine 120 and a generator 122. Carbon dioxide received from expansion turbine 120 at compressor 126 is compressed under power from motor 124 and injected into one or more of reservoir 110B and reservoir 110C via reservoir injection equipment 106B and 106C, respectively. In one example approach, source isolation valve 114 isolates CCS system from the carbon dioxide source, while power equipment isolation valve 116 isolates the power equipment from the carbon dioxide source while carbon dioxide is being injected into reservoir 110A.

In the example shown in FIG. 6, injection equipment 106A receives carbon dioxide from a carbon dioxide source through a source isolation valve 114 (shown as open). Power generation isolation valve 116 is closed to isolate the power generation equipment 118 while isolation valve 108 of reservoir injection equipment 106A is open to allow the reservoir injection equipment 106A to inject carbon dioxide received from the carbon dioxide source into sequestration reservoir 110A. In one example approach, the carbon dioxide is pressurized and heated to supercritical pressure and injected into reservoir 110A under high-pressure. Injection continues until the reservoir is full or until an operator decides to generate electricity from the sequestered carbon dioxide. This may, in some example approaches, occur when the operator determines that power generation based on the stored carbon dioxide is more economically beneficial than further injection. When power generation based on the stored carbon dioxide is more economically beneficial than injection, injection pauses (i.e., isolation valve 114 is closed as shown in FIG. 7) and power generation begins.

In one example approach, CCS system 100 of FIG. 6 also includes a computer system 150 such as is shown in FIGS. 1, 2, 4 and 5. In one such example approach, computer system 150 includes a processor 152 and a memory 154. In one example approach, instructions are stored in memory 154 that, when executed by processor 152, allow the processor 152 to control the injection and power generation processes. In one example approach the computer system 150 receives a signal from a carbon dioxide source indicating that carbon dioxide is available for injection in a sequestration reservoir 110. Processor 152 access instructions stored in memory 154 to determine the reservoirs 110A, 110B and 110C to be used to receive the carbon dioxide. In the example shown in FIG. 6, the carbon dioxide is stored as supercritical carbon dioxide in reservoir 110A, so processor 152 accesses instructions stored in memory 154 to send out signals opening source isolation valve 114 and isolation valve 108 of reservoir injection equipment 106A and closing isolation valve 116. Processor 152 then activates reservoir injection equipment 106A to inject the received carbon dioxide in reservoir 110A. When an operator determines to generate electricity based on the carbon dioxide stored in reservoir 110A, processor 152 accesses instructions stored in memory 154 to pause injection (i.e., close source isolation valve 114) and opens power equipment isolation valve 116 and isolation valve 108 of the reservoir injection equipment 106 of the reservoir(s) 110 selected to receive the recompressed supercritical carbon dioxide from compressor 126, as shown in FIG. 7. Power generation then begins.

Figure 7:
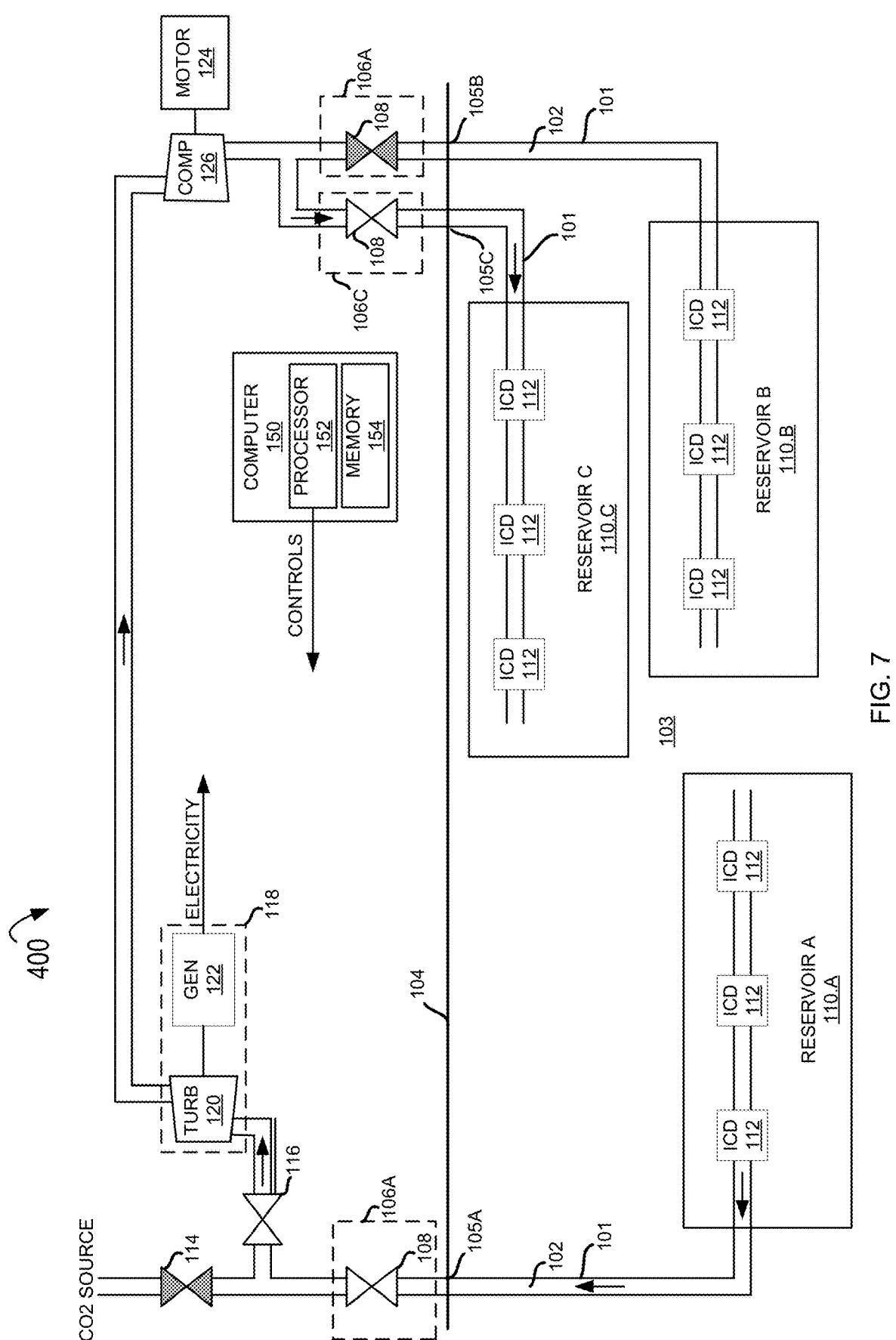
FIG. 7 illustrates the example CCS system of FIG. 6 configured to generate electricity, according to aspects of the present disclosure.

FIG. 7 illustrates the CCS system of FIG. 6 configured to generate electricity, according to aspects of the present disclosure. In the example shown in FIG. 7, source isolation valve 114 is closed, while power equipment isolation valve

116 is open, allowing sequestered carbon dioxide from reservoir 110A to flow through isolation valve 108 of injection equipment 106A and power equipment isolation valve 116 to power generation equipment 118. In the example approach shown in FIG. 7, the power generation equipment 118 includes an expansion turbine 120 and a generator 122. Supercritical carbon dioxide stored in reservoir 110A flows through expansion turbine 120, turning generator 122 to generate electricity. In some example approaches, the carbon dioxide flowing from expansion turbine 120 is compressed by compressor 126 when powered by motor 124 and injected into reservoir(s) 110B and/or 110C via reservoir injection equipment 106B and 106C, respectively.

In one example approach, CCS system 100 of FIGS. 6 and 7 include a computer system 150 having a processor 152 and a memory 154. In one example approach, instructions are stored in memory 154 that, when executed by processor 152, allow the processor 152 to control the injection and power generation processes. In one example approach, the computer system 150 receives a signal from an operator indicating that the operator wants to generate electricity. Processor 152 accesses instructions stored in memory 154 to determine the reservoirs 110 to be used to retrieve the carbon dioxide and the reservoir(s) 110 to be used to reinject the supercritical carbon dioxide. In the example shown in FIG. 7, the carbon dioxide to be used for power generation is stored in reservoir 110A, so processor 152 accesses instructions stored in memory 154 to send out signals closing source isolation valve 114 and opening power equipment isolation valve 116 and isolation valves 108 of reservoir injection equipment 106B and 106C. If pressure in either reservoir 110B or 110C is sufficiently lower than pressure in reservoir 110A, supercritical carbon dioxide flows between reservoir 110C and 110B, passing through expansion turbine 120 and generating electricity via generator 122. The operator may cut off the electricity generation process at any time and resume injecting supercritical carbon dioxide into reservoir 110A.

In some such example approaches, as shown in FIGS. 6 and 7, boreholes 102 further include inflow control devices (ICDs) 112 placed at certain locations in each reservoir 110. The supercritical carbon dioxide stored in reservoir 110A passes through the ICDs 112 when extracted for power generation. In some example approaches, the ICDs limit the amount of brine and other contaminants in the supercritical carbon dioxide extracted from the reservoirs 110 since the combination of carbon dioxide and brine will not expand across the turbine as well, reducing the Brayton cycle efficiency. Combining the above electricity generation method with an appropriate DAICD or EICD system may substantially improve the overall energy recovery and efficiency.

Figure 8:
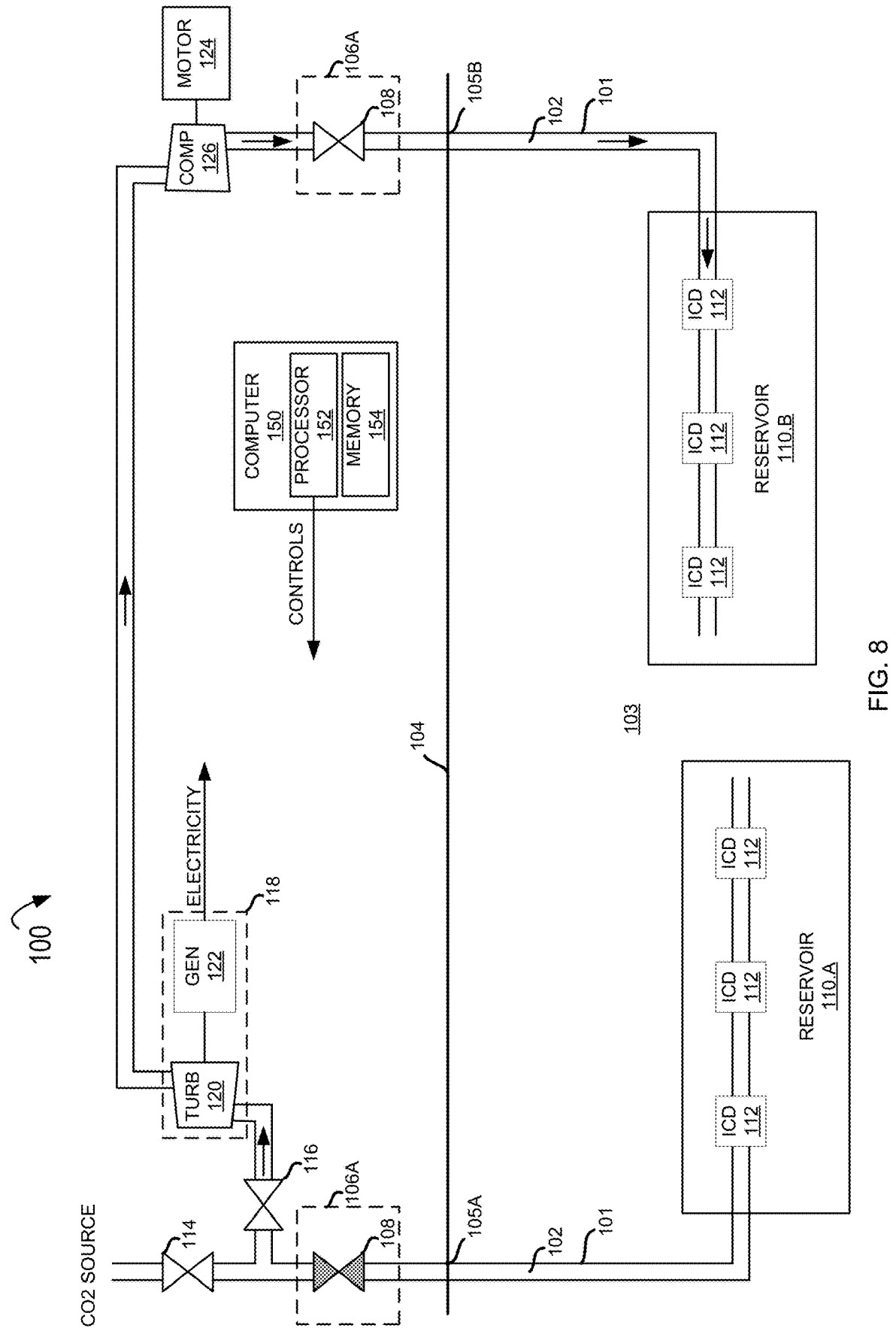
FIG. 8 illustrates another approach for generating electricity from supercritical carbon dioxide, according to aspects of the present disclosure.

FIG. 8 illustrates another approach for generating electricity from supercritical carbon dioxide, according to aspects of the present disclosure. In the example shown in FIG. 8, the CCS system 100 of FIGS. 1 and 2 is used to generate electricity directly from supercritical carbon dioxide received from a carbon dioxide source. In the example shown in FIG. 8, power equipment isolation valve 116 receives supercritical carbon dioxide from a carbon dioxide source through source isolation valve 114 (both shown as open). Isolation valve 108 of reservoir injection equipment 106A is closed to isolate the sequestration reservoir 110A.

In the example shown in FIG. 8, while power equipment isolation valve 116 is open supercritical carbon dioxide flows from the carbon dioxide source to power generation equipment 118. In the example approach shown in FIG. 8, the power generation equipment 118 includes an expansion turbine 120 and a generator 122. The supercritical carbon dioxide flows through expansion turbine 120, turning generator 122 to generate electricity. In some example approaches, the carbon dioxide flowing from expansion turbine 120 is compressed by compressor 126 when powered by motor 124 and is injected into reservoir 110B via reservoir injection equipment 106B. In one example approach, the carbon dioxide is pressurized and heated to supercritical pressure and injected into reservoir 110B under high-pressure. Injection continues until the reservoir is full.

In one example approach, CCS system 100 of FIG. 8 also includes a computer system 150 such as is shown in FIGS. 1, 2, and 4-7. In one such example approach, computer system 150 includes a processor 152 and a memory 154. In one example approach, instructions are stored in memory 154 that, when executed by processor 152, allow the processor 152 to control the injection and power generation processes. In one example approach the computer system 150 receives a signal from a carbon dioxide source indicating that carbon dioxide is available for injection in a sequestration reservoir 110. Processor 152 access instructions stored in memory 154 to determine the reservoirs 110A and 110B to be used to receive the carbon dioxide. In the example shown in FIG. 8, the carbon dioxide is stored as supercritical carbon dioxide in reservoir 110B, so processor 152 accesses instructions stored in memory 154 to send out signals activating reservoir injection equipment 106B to inject the received carbon dioxide in reservoir 110B. Power generation then begins.

Figure 9:
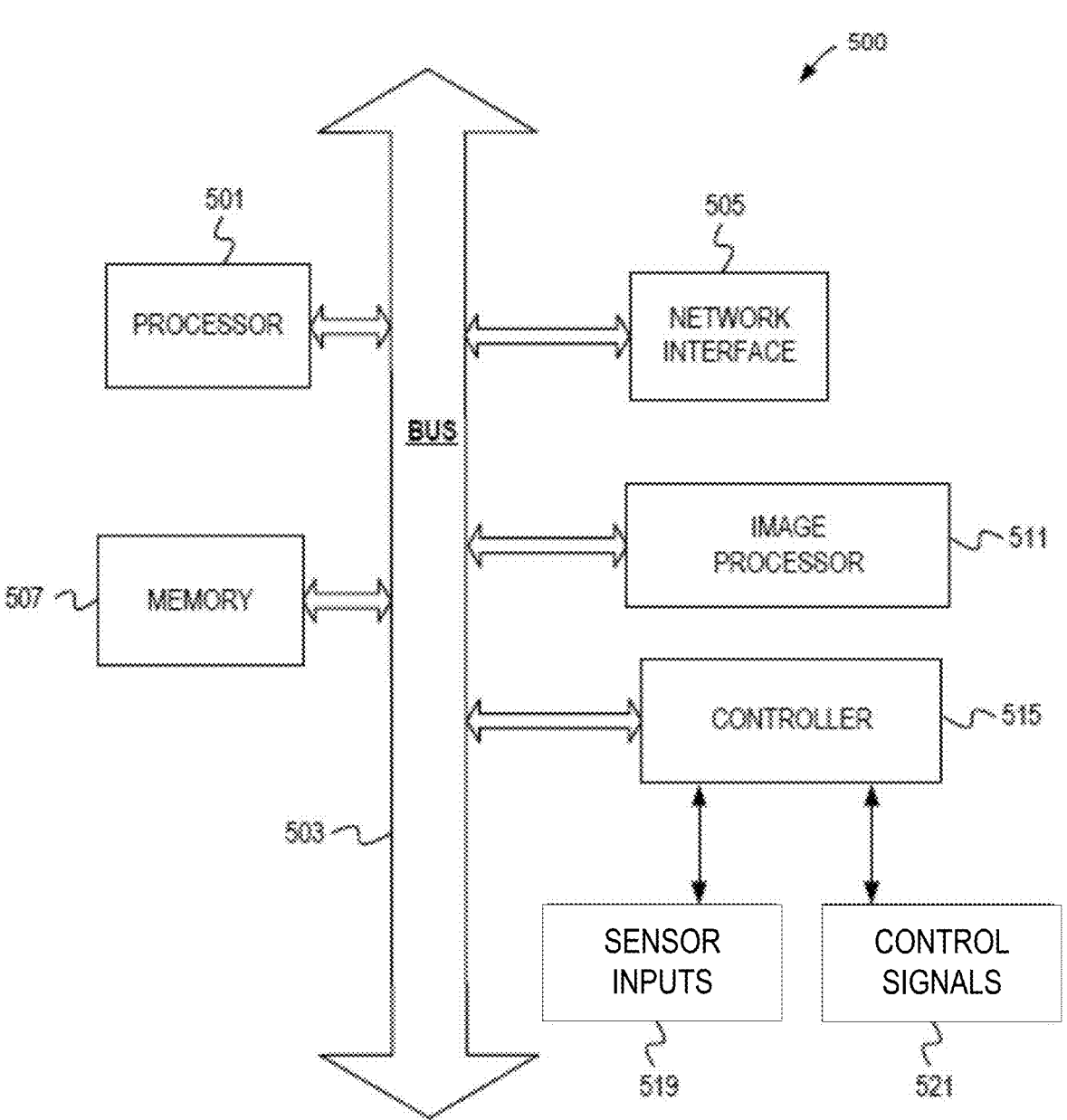
FIG. 9 illustrates a computer system that may be used as the computer system for any of the CCS systems of FIGS. 1, 2 and 4-8.

FIG. 9 illustrates a computer system that may be used as the computer system 150 for any of the CCS systems of FIGS. 1, 2 and 4-8. Computer system 500 may be employed to practice the concepts, methods, and techniques disclosed herein, and variations thereof. In one example approach, computer system 500 includes a plurality of components in electrical communication with each other, in some examples using a bus 503. The computing system 500 may include any suitable computer, controller, or data processing apparatus capable of being programmed to carry out the method and apparatus as further described herein.

In one example approach, computing system 500 may be a general-purpose computer, and may include a processor 501 (possibly including multiple processors, multiple cores, multiple nodes, and/or implementing multi-threading, etc.). In one such example approach, computer system 500 includes a memory 507. The memory 507 may be system memory (e.g., one or more of cache, SRAM, or DRAM) or any one or more of the possible realizations of machine-readable media. Computer system 500 also includes bus 503 (e.g., PCI, ISA, PCI-Express, etc.) and a network interface 505 (e.g., ethernet or Fiber Channel).

The computer may also include an image processor 511 and a controller 515. The controller 515 may control the different operations that can occur in response to data received at sensor inputs 519 and/or calculations based on data received from sensor inputs 519 (such as data from sensors used to sense, for instance, the pressure of the carbon dioxide being received from the carbon dioxide source in FIGS. 1, 4 and 6 using any of the techniques described herein, and any equivalents thereof, to provide outputs to control compressors 126, motors 124 and the various valves in CCS system 100. In some example approaches, controller 515 may communicate instructions to the appropriate equipment, devices, etc., such as reservoir injection equipment 106, to inject supercritical carbon dioxide into reservoirs 110 and to extract supercritical carbon dioxide from reservoirs 110 to be used to generate electricity as described above. Any one of the previously described functions may be partially (or entirely) implemented in hardware and/or on the processor 501. For example, the functions may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). As illustrated in FIG. 5, the processor 501 and the network interface 505 are coupled to the bus 503. Although illustrated as also being coupled to the bus 503, the memory 507 may be coupled to the processor 501 only, to both processor 501 and bus 503 or to processor 501, image processor 511 and bus 503. Controller 515 may be coupled to sensor inputs 519 and to pumps 114 using any type of wired or wireless connection(s), and may receive data, such as measurement data, obtained by sensors inputs 519. Sensor inputs 519 may include any of the sensors associated with a wellbore environment, including but not limited to the pressure sensors configured to output signals indicative of pressure level at points within CCS system 100. Controller 515 may include circuitry, such as analog-to-digital (A/D) converters and buffers that allow controller 515 to receive electrical signals directly from one or more of the sensor inputs 519.

Processor 501 may be configured to execute instructions that provide control over the pressurized fluid used in CCS system 100 as described in this disclosure, and over any equivalents thereof. For example, processor 501 may control operations of one or more of the compressors being utilized to pressurize supercritical carbon dioxide before it is injected into reservoirs 110. In addition, processor 501 may be configured to execute instructions that provide control of the equipment used to direct the pressurized fluid used in CCS system 100 into and between reservoirs 110 as described in this disclosure.

With respect to computing system 500, basic features here may easily be substituted for improved hardware or firmware arrangements as they are developed. In some examples, memory 507 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, may be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general-purpose computer, some embodiments can be any type of device or apparatus to perform operations described herein.

Example Operations

Figure 10:
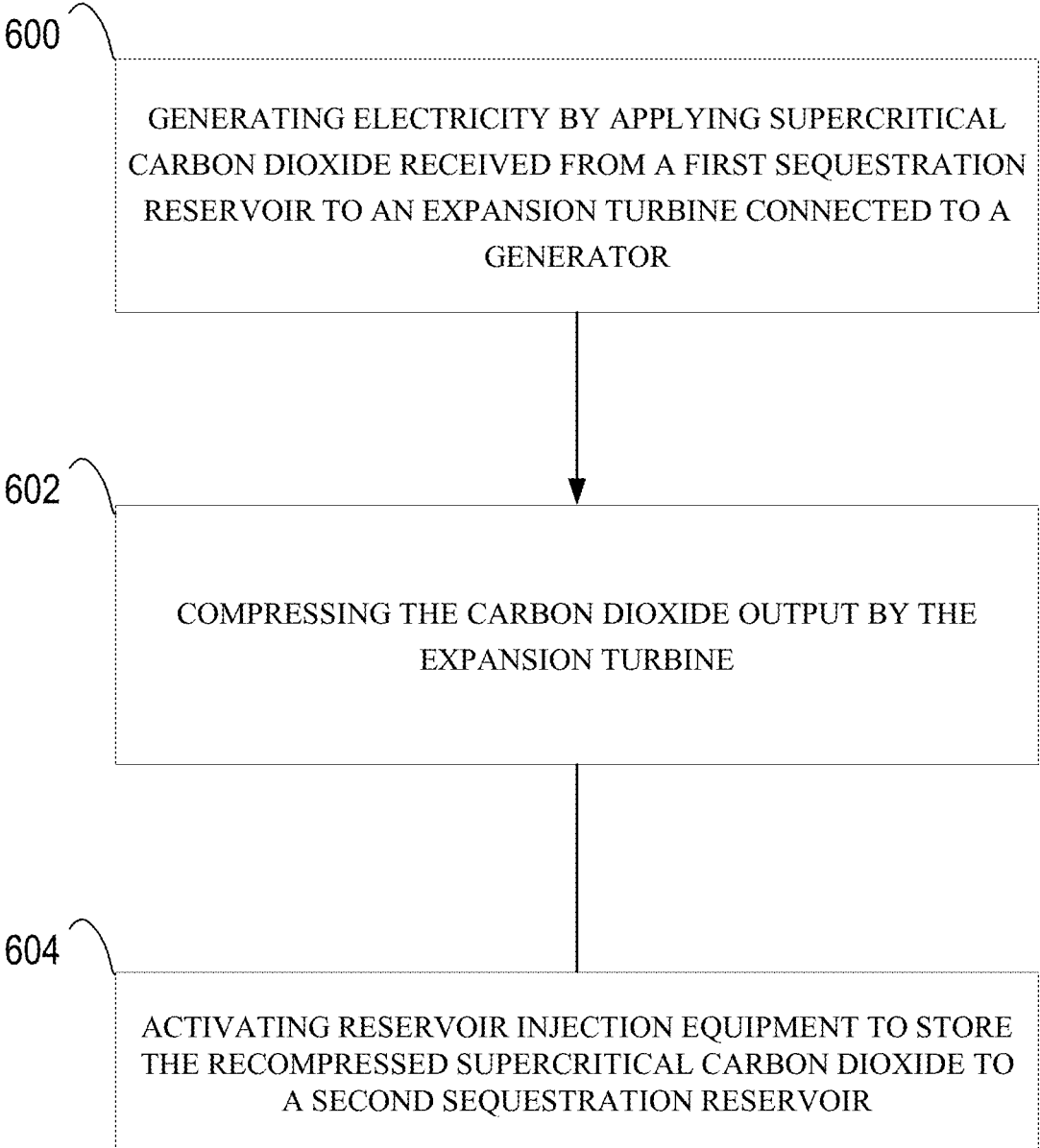
FIG. 10 is a flowchart illustrating a method of generating electricity from sequestered carbon dioxide, according to aspects of the present disclosure.

FIG. 10 is a flowchart illustrating a method of generating electricity from sequestered carbon dioxide, according to aspects of the present disclosure. In the flowchart of FIG. 10, a method includes receiving supercritical carbon dioxide from a sequestration reservoir 110 and generating electricity from the supercritical carbon dioxide via an expansion turbine 120 connected to a generator (600). The method further includes compressing the carbon dioxide output by the expansion turbine 120 to a desired supercritical state (602) and activating reservoir injection equipment 106 to inject the supercritical carbon dioxide (604) into a different sequestration reservoir 110. In some example approaches, an operator interacts with a computer system 150 to determine when to generate electricity from the supercritical carbon dioxide stored in the reservoirs 110.

Figure 11:
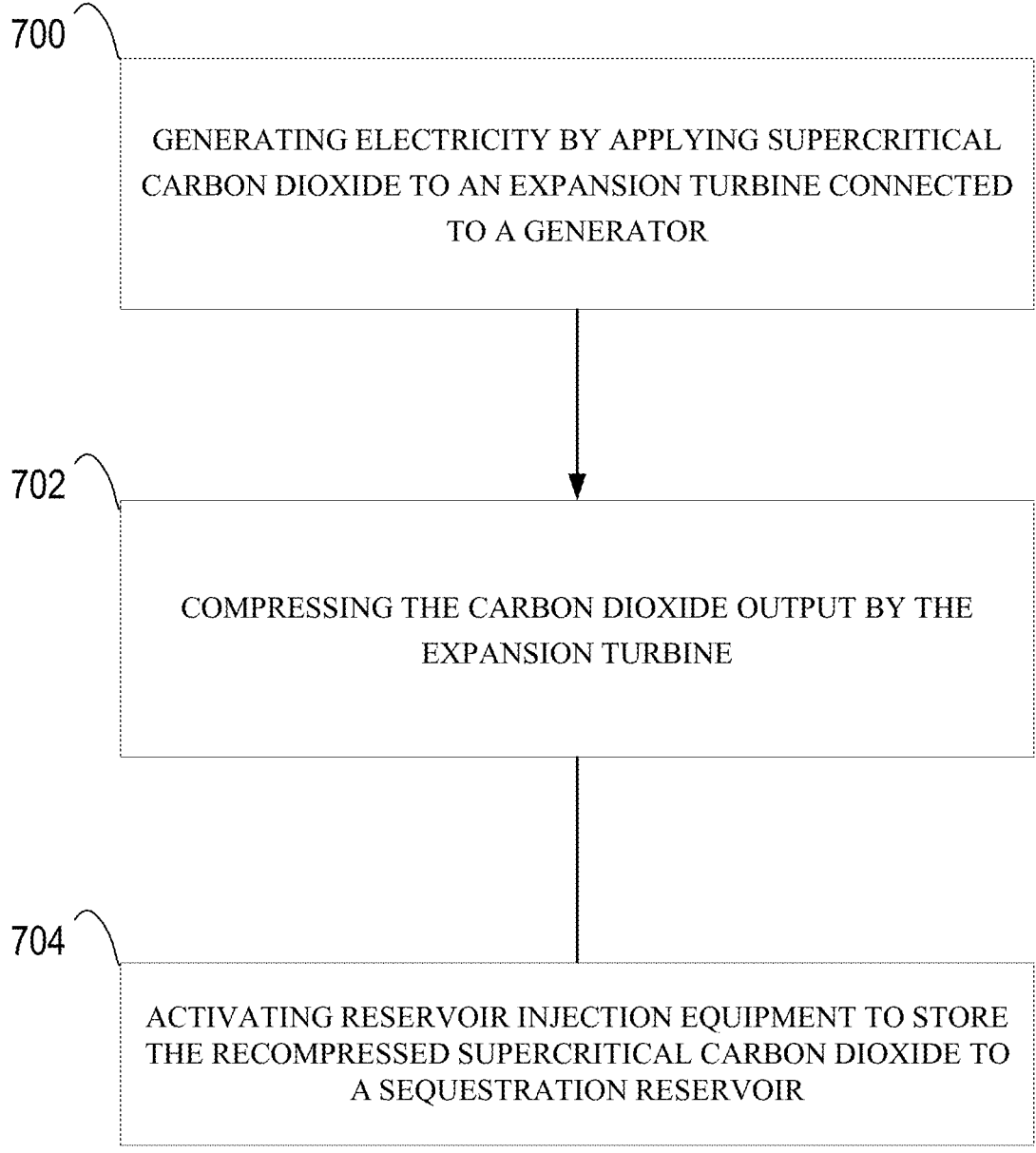
FIG. 11 is a flowchart illustrating a method of generating electricity from a supercritical fluid, according to aspects of the present disclosure.

FIG. 11 is a flowchart illustrating a method of generating electricity from a supercritical fluid, according to aspects of the present disclosure. In the flowchart of FIG. 11, a method includes receiving supercritical carbon dioxide from a carbon source and generating electricity from the supercritical carbon dioxide via an expansion turbine 120 connected to a generator (700). The method further includes compressing the carbon dioxide output by the expansion turbine 120 to a desired supercritical state (702) and activating reservoir injection equipment 106 to inject the supercritical carbon dioxide (704) into a sequestration reservoir 110. In some example approaches, an operator interacts with a computer system 150 to determine when to generate electricity from the supercritical carbon dioxide stored in the reservoirs 110 as described in the method of FIG. 9 above.

As noted above, CCS is typically considered an expense that needs to be incentivized or subsidized via taxes or other means. The CCS systems of FIGS. 1, 2 and 4-7 illustrate that it is possible to not only sequester carbon dioxide permanently but to also use the stored carbon dioxide to generate revenue through power generation. In one such example approach, a CCS system (100, 300, 400) pressurizes carbon dioxide before injecting the carbon dioxide at supercritical pressure into a high-pressure formation. The CCS system continues to inject the supercritical carbon dioxide until power generation based on the stored carbon dioxide is more economically beneficial than injection or until electrical demand reaches a certain predefined threshold. The CCS system then isolates the carbon dioxide source and uses the pressurized supercritical carbine dioxide stored in one of the sequestration reservoirs to produce electricity.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and the described program components and systems can generally be integrated together in a single software product or packaged into multiple software products. Additionally, other implementations are within the scope of the following claims. In some cases, the actions recited in the claims can be performed in a different order and still achieve desirable results.

EXAMPLE EMBODIMENTS

Embodiment #2: The method of Embodiment #1, wherein generating electricity includes receiving the supercritical fluid from one or more second sequestration reservoirs in the reservoir formation.

Embodiment #3: The method of Embodiment #2, wherein receiving the supercritical fluid from one or more second sequestration reservoirs in the reservoir formation includes applying one or more inflow control devices to the fluid in the one or more second sequestration reservoirs.

Embodiment #4: The method of Embodiment #2, wherein injecting the compressed fluid into one or more first sequestration reservoirs in a reservoir formation includes selecting the one or more first sequestration reservoirs from a plurality of sequestration reservoirs in the reservoir formation.

Embodiment #5: The method of any one of Embodiments #1-4, wherein generating electricity includes receiving the supercritical fluid from a fluid source.

Embodiment #6: The method of Embodiment #5, wherein the method further includes injecting the compressed fluid received from the fluid source into one or more second sequestration reservoirs in the reservoir formation.

Embodiment #7: The method of Embodiment #5, wherein the method further includes injecting the compressed fluid received from the fluid source into one or more second sequestration reservoirs in the reservoir formation while the benefit for injecting the compressed fluid received from the fluid source into the one or more second sequestration reservoirs outweighs the benefit for generating electricity from the compressed fluid received from the fluid source.

Embodiment #8: The method of any one of Embodiments #1-7, wherein outputting the fluid from the expansion turbine after expansion includes outputting the fluid in a supercritical state.

Embodiment #9: The method of any one of Embodiments #1-8, wherein injecting the compressed fluid into one or more first sequestration reservoirs in a reservoir formation includes selecting the first sequestration reservoirs from a plurality of sequestration reservoirs in the reservoir formation.

Embodiment #10: The method of any one of Embodiments #1-9, wherein injecting the compressed fluid into one or more first sequestration reservoirs in a reservoir formation includes detecting when the one or more first sequestration reservoirs are full.

Embodiment #11: The method of any one of Embodiments #1-10, wherein the supercritical fluid includes one or more of supercritical carbon dioxide, supercritical nitrogen, supercritical helium, or supercritical air.

Embodiment #12: A Carbon Capture and Storage (CCS) system, comprising: a plurality of sets of reservoir injection equipment, each set of reservoir injection equipment including an isolation valve, each set of reservoir isolation equipment configured to connect through a borehole to a sequestration reservoir in a reservoir formation; power generation equipment having an expansion turbine connected to a generator, the power generation equipment connected to one or more of the sets of reservoir injection equipment, the power generation equipment configured to receive supercritical fluid; a compressor connected to a motor and to the expansion turbine; and a computer system having a processor and a memory, the memory including instructions that, when executed by the processor, cause the processor to: generate electricity via the generator by applying the supercritical fluid to the expansion turbine connected to the generator, wherein generating includes outputting the fluid from the expansion turbine after expansion; compress the fluid output by the expansion turbine into a desired supercritical state via the compressor; and injecting the compressed fluid into one or more first sequestration reservoirs in the reservoir formation.

Embodiment #13: The CCS system of Embodiment #12, wherein the instructions that, when executed by the processor, cause the processor to generate electricity include instructions that, when executed by the processor, cause the processor to receive the supercritical fluid from one or more second sequestration reservoirs in the reservoir formation.

Embodiment #14: The CCS system of any one of Embodiments #12-13, wherein the instructions that, when executed by the processor, cause the processor to generate electricity include instructions that, when executed by the processor, cause the processor to:

16 receive the supercritical fluid from a fluid source; and inject the compressed fluid received from the fluid source into one or more second sequestration reservoirs in the reservoir formation while the benefit for injecting the compressed fluid received from the fluid source into the one or more second sequestration reservoirs outweighs the benefit for generating electricity from the compressed fluid received from the fluid source.

Embodiment #15: The CCS system of any one of Embodiments #12-14, wherein the instructions that, when executed by the processor, cause the processor to generate electricity include instructions that, when executed by the processor, cause the processor to configure the CCS system to output fluid from the expansion turbine in a supercritical state.

Embodiment #16: The CCS system of Embodiment #15, wherein configuring the CCS system includes adapting the CCS system to the supercritical fluid, wherein the supercritical fluid includes one or more of supercritical carbon dioxide, supercritical nitrogen, supercritical helium, or supercritical air.

Embodiment #17: The CCS system of any one of Embodiments #12-16, wherein the instructions that, when executed by the processor, cause the processor to inject the compressed fluid into one or more first sequestration reservoirs in the reservoir formation include instructions that, when executed by the processor, cause the processor to select the one or more first sequestration reservoirs from a plurality of sequestration reservoirs in the reservoir formation and to detect when one of the one or more first sequestration reservoirs are full.

Embodiment #18: A non-transitory computer readable medium storing instructions that, when executed by a computer cause the computer to: generate electricity by applying a supercritical fluid to an expansion turbine connected to a generator, wherein generating includes outputting the fluid from the expansion turbine after expansion; compress the fluid output by the expansion turbine into a desired supercritical state; and inject the compressed fluid into one or more first sequestration reservoirs in a reservoir formation.

Embodiment #19: The non-transitory computer readable medium of Embodiment #18, wherein the instructions that, when executed by the computer, cause the computer to generate electricity include instructions that, when executed by the computer, cause the computer to receive the supercritical fluid from one or more second sequestration reservoirs in the reservoir formation.

Embodiment #20: The non-transitory computer readable medium of Embodiment #19, wherein the instructions that, when executed by the computer, cause the computer to receive the supercritical fluid from one or more second sequestration reservoirs in the reservoir formation include instructions that, when executed by the computer, cause the computer to apply one or more inflow control devices to the fluid in the one or more second sequestration reservoirs.

Example embodiments are now described.

Embodiment #1: A method, comprising: generating electricity by applying a supercritical fluid to an expansion turbine connected to a generator, wherein generating includes outputting the fluid from the expansion turbine after expansion; compressing the fluid output by the expansion turbine into a desired supercritical state; and injecting the compressed fluid into one or more first sequestration reservoirs in a reservoir formation.

Embodiment #2: The method of Embodiment #1, wherein generating electricity includes receiving the supercritical fluid from one or more second sequestration reservoirs in the reservoir formation.

Embodiment #3: The method of Embodiment #2, wherein receiving the supercritical fluid from one or more second sequestration reservoirs in the reservoir formation includes applying one or more inflow control devices to the fluid in the one or more second sequestration reservoirs.

Embodiment #4: The method of Embodiment #2, wherein injecting the compressed fluid into one or more first sequestration reservoirs in a reservoir formation includes selecting the one or more first sequestration reservoirs from a plurality of sequestration reservoirs in the reservoir formation.

Embodiment #5: The method of any one of Embodiments #1-4, wherein generating electricity includes receiving the supercritical fluid from a fluid source.

Embodiment #6: The method of Embodiment #5, wherein the method further includes injecting the compressed fluid received from the fluid source into one or more second sequestration reservoirs in the reservoir formation.

Embodiment #7: The method of Embodiment #5, wherein the method further includes injecting the compressed fluid received from the fluid source into one or more second sequestration reservoirs in the reservoir formation while the benefit for injecting the compressed fluid received from the fluid source into the one or more second sequestration reservoirs outweighs the benefit for generating electricity from the compressed fluid received from the fluid source.

Embodiment #8: The method of any one of Embodiments #1-7, wherein outputting the fluid from the expansion turbine after expansion includes outputting the fluid in a supercritical state.

Embodiment #9: The method of any one of Embodiments #1-8, wherein injecting the compressed fluid into one or more first sequestration reservoirs in a reservoir formation includes selecting the first sequestration reservoirs from a plurality of sequestration reservoirs in the reservoir formation.

Embodiment #10: The method of any one of Embodiments #1-9, wherein injecting the compressed fluid into one or more first sequestration reservoirs in a reservoir formation includes detecting when the one or more first sequestration reservoirs are full.

Embodiment #11: The method of any one of Embodiments #1-10, wherein the supercritical fluid includes one or more of supercritical carbon dioxide, supercritical nitrogen, supercritical helium, or supercritical air.

Embodiment #12: A Carbon Capture and Storage (CCS) system, comprising: a plurality of sets of reservoir injection equipment, each set of reservoir injection equipment including an isolation valve, each set of reservoir isolation equipment configured to connect through a borehole to a sequestration reservoir in a reservoir formation; power generation equipment having an expansion turbine connected to a generator, the power generation equipment connected to one or more of the sets of reservoir injection equipment, the power generation equipment configured to receive supercritical fluid; a compressor connected to a motor and to the expansion turbine; and a computer system having a processor and a memory, the memory including instructions that, when executed by the processor, cause the processor to: generate electricity via the generator by applying the supercritical fluid to the expansion turbine connected to the generator, wherein generating includes outputting the fluid from the expansion turbine after expansion; compress the fluid output by the expansion turbine into a desired supercritical state via the compressor; and injecting the compressed fluid into one or more first sequestration reservoirs in the reservoir formation.

Embodiment #13: The CCS system of Embodiment #12, wherein the instructions that, when executed by the processor, cause the processor to generate electricity include instructions that, when executed by the processor, cause the processor to receive the supercritical fluid from one or more second sequestration reservoirs in the reservoir formation.

Embodiment #14: The CCS system of any one of Embodiments #12-13, wherein the instructions that, when executed by the processor, cause the processor to generate electricity include instructions that, when executed by the processor, cause the processor to: receive the supercritical fluid from a fluid source; and inject the compressed fluid received from the fluid source into one or more second sequestration reservoirs in the reservoir formation while the benefit for injecting the compressed fluid received from the fluid source into the one or more second sequestration reservoirs outweighs the benefit for generating electricity from the compressed fluid received from the fluid source.

Embodiment #15: The CCS system of any one of Embodiments #12-14, wherein the instructions that, when executed by the processor, cause the processor to generate electricity include instructions that, when executed by the processor, cause the processor to configure the CCS system to output fluid from the expansion turbine in a supercritical state.

Embodiment #16: The CCS system of Embodiment #15, wherein configuring the CCS system includes adapting the CCS system to the supercritical fluid, wherein the supercritical fluid includes one or more of supercritical carbon dioxide, supercritical nitrogen, supercritical helium, or supercritical air.

Embodiment #17: The CCS system of any one of Embodiments #12-16, wherein the instructions that, when executed by the processor, cause the processor to inject the compressed fluid into one or more first sequestration reservoirs in the reservoir formation include instructions that, when executed by the processor, cause the processor to select the one or more first sequestration reservoirs from a plurality of sequestration reservoirs in the reservoir formation and to detect when one of the one or more first sequestration reservoirs are full.

Embodiment #18: A non-transitory computer readable medium storing instructions that, when executed by a computer cause the computer to: generate electricity by applying a supercritical fluid to an expansion turbine connected to a generator, wherein generating includes outputting the fluid from the expansion turbine after expansion; compress the fluid output by the expansion turbine into a desired supercritical state; and inject the compressed fluid into one or more first sequestration reservoirs in a reservoir formation.

Embodiment #19: The non-transitory computer readable medium of Embodiment #18, wherein the instructions that, when executed by the computer, cause the computer to generate electricity include instructions that, when executed by the computer, cause the computer to receive the supercritical fluid from one or more second sequestration reservoirs in the reservoir formation.

Embodiment #20: The non-transitory computer readable medium of Embodiment #19, wherein the instructions that, when executed by the computer, cause the computer to receive the supercritical fluid from one or more second sequestration reservoirs in the reservoir formation include instructions that, when executed by the computer, cause the computer to apply one or more inflow control devices to the fluid in the one or more second sequestration reservoirs

What is claimed is:

1. A method, comprising:
generating electricity by applying a supercritical fluid to an expansion turbine connected to a generator, wherein generating includes outputting the fluid from the expansion turbine after expansion;
compressing the fluid output by the expansion turbine into a desired supercritical state; and
injecting the compressed fluid into one or more first sequestration reservoirs in a reservoir formation.

2. The method of claim 1, wherein generating electricity includes receiving the supercritical fluid from one or more second sequestration reservoirs in the reservoir formation.

3. The method of claim 2, wherein receiving the supercritical fluid from one or more second sequestration reservoirs in the reservoir formation includes applying one or more inflow control devices to the supercritical fluid in two or more of the second sequestration reservoirs to select a most energetic second sequestration reservoir from the two or more second sequestration reservoirs.

4. The method of claim 2, wherein injecting the compressed fluid into one or more first sequestration reservoirs in a reservoir formation includes selecting a least energetic first sequestration reservoir from the one or more first sequestration reservoirs in the reservoir formation.

5. The method of claim 1, wherein generating electricity includes receiving the supercritical fluid from a fluid source.

6. The method of claim 5, wherein the method further includes injecting the supercritical fluid received from the fluid source into one or more second sequestration reservoirs in the reservoir formation.

7. The method of claim 5, wherein the method further includes injecting the supercritical fluid received from the fluid source into one or more second sequestration reservoirs in the reservoir formation while the benefit for injecting the supercritical fluid received from the fluid source into the one or more second sequestration reservoirs outweighs the benefit for generating electricity from the supercritical fluid received from the fluid source.

8. The method of claim 1, wherein outputting the fluid from the expansion turbine after expansion includes outputting the fluid in a supercritical state.

9. The method of claim 1, wherein injecting the compressed fluid into one or more first sequestration reservoirs in a reservoir formation includes selecting a least energetic first sequestration reservoir from the one or more first sequestration reservoirs in the reservoir formation.

10. The method of claim 1, wherein injecting the compressed fluid into one or more first sequestration reservoirs in a reservoir formation includes detecting when one or more of the first sequestration reservoirs are full.

11. The method of claim 1, wherein the supercritical fluid includes one or more of supercritical carbon dioxide, supercritical nitrogen, supercritical helium, or supercritical air.

12. A Carbon Capture and Storage (CCS) system, comprising:
a plurality of sets of reservoir injection equipment, each set of reservoir injection equipment including an isolation valve, each set of reservoir isolation equipment configured to connect through a borehole to a sequestration reservoir in a reservoir formation;
power generation equipment having an expansion turbine connected to a generator, the power generation equipment connected to one or more of the sets of reservoir injection equipment, the power generation equipment configured to receive supercritical fluid;
a compressor connected to a motor and to the expansion turbine; and
a computer system having a processor and a memory, the memory including instructions that, when executed by the processor, cause the processor to:
generate electricity via the generator by applying the supercritical fluid to the expansion turbine connected to the generator, wherein generating includes outputting the fluid from the expansion turbine after expansion;
compress the fluid output by the expansion turbine into a desired supercritical state via the compressor; and
inject the compressed fluid into one or more first sequestration reservoirs in the reservoir formation.

13. The CCS system of claim 12, wherein the instructions that, when executed by the processor, cause the processor to generate electricity include instructions that, when executed by the processor, cause the processor to receive the supercritical fluid from one or more second sequestration reservoirs in the reservoir formation.

14. The CCS system of claim 12, wherein the instructions that, when executed by the processor, cause the processor to generate electricity include instructions that, when executed by the processor, cause the processor to:
receive the supercritical fluid from a fluid source; and
inject the supercritical received from the fluid source into one or more second sequestration reservoirs in the reservoir formation while the benefit for injecting the supercritical fluid received from the fluid source outweighs the benefit for generating electricity from the supercritical fluid received from the fluid source.

15. The CCS system of claim 12, wherein the instructions that, when executed by the processor, cause the processor to generate electricity include instructions that, when executed by the processor, cause the processor to configure the CCS system to output fluid from the expansion turbine in a supercritical state.

16. The CCS system of claim 15, wherein configuring the CCS system includes adapting the CCS system to the supercritical fluid, wherein the supercritical fluid includes one or more of supercritical carbon dioxide, supercritical nitrogen, supercritical helium, or supercritical air.

17. The CCS system of claim 12, wherein the instructions that, when executed by the processor, cause the processor to inject the compressed fluid into one or more first sequestration reservoirs in the reservoir formation include instructions that, when executed by the processor, cause the processor to select the one or more first sequestration reservoirs from a plurality of first sequestration reservoirs in the reservoir formation and to detect when one of the one or more first sequestration reservoirs is full.

18. A non-transitory computer readable medium storing instructions that, when executed by a computer cause the computer to:

generate electricity by applying a supercritical fluid to an expansion turbine connected to a generator, wherein generating includes outputting the fluid from the expansion turbine after expansion;

compress the fluid output by the expansion turbine into a desired supercritical state; and inject the compressed fluid into one or more first sequestration reservoirs in a reservoir formation.

19. The non-transitory computer readable medium of claim 18, wherein the instructions that, when executed by the computer, cause the computer to generate electricity include instructions that, when executed by the computer, cause the computer to receive the supercritical fluid from one or more second sequestration reservoirs in the reservoir formation.

20. The non-transitory computer readable medium of claim 19, wherein the instructions that, when executed by the computer, cause the computer to receive the supercritical fluid from one or more second sequestration reservoirs in the reservoir formation include instructions that, when executed by the computer, cause the computer to apply one or more inflow control devices to the supercritical fluid in two or more of the second sequestration reservoirs to select a most energetic second sequestration reservoir from the two or more second sequestration reservoirs.

* * * * *